2,912,145
VALVE FOR BEVERAGE DISPENSER

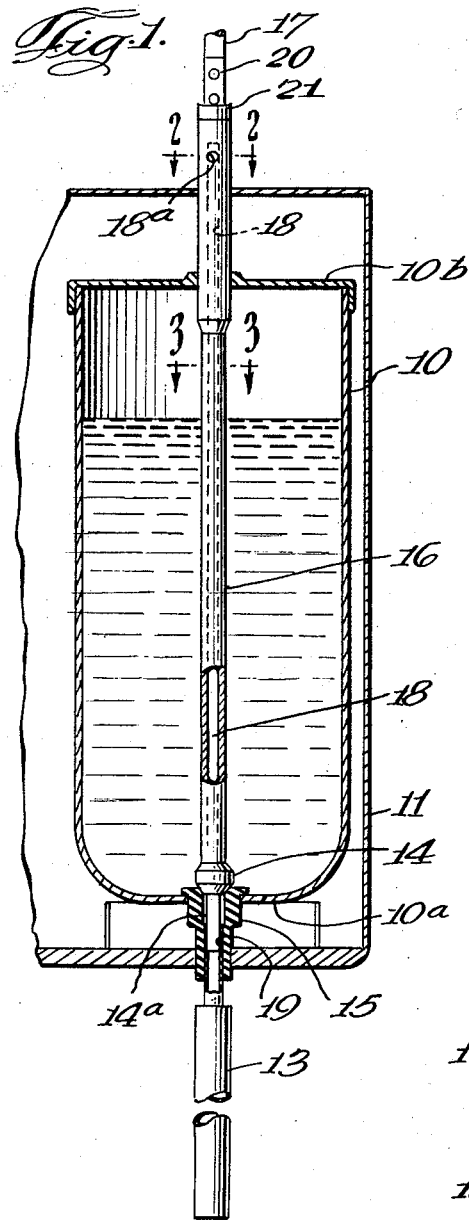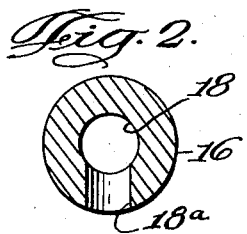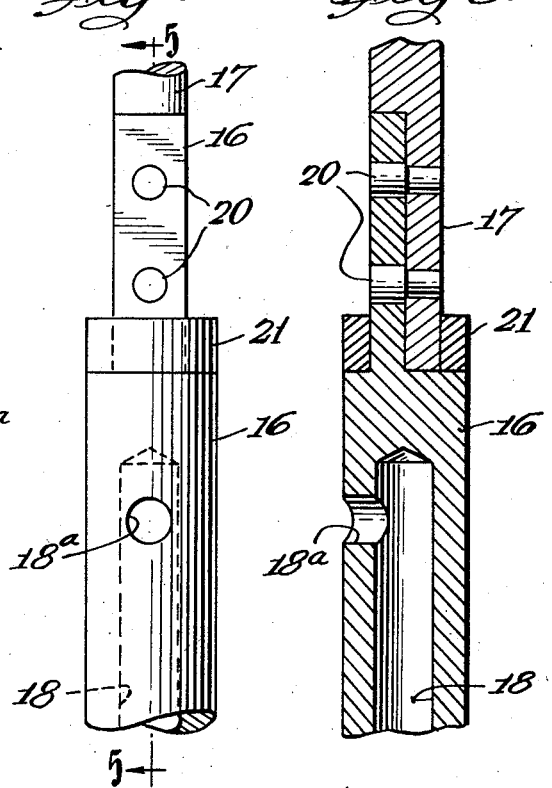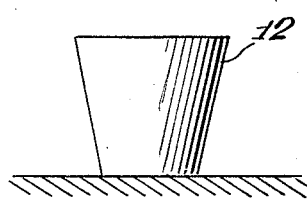

Leslie Arnett and William G. Freise, Chicago, Ill., assignors to United Coffee Corporation, a corporation of Illinois Application November 15, 1955, Serial No. 546,977

2 Claims. (Cl. 222—481)

This application relates to a beverage dispenser valve and in particular to a valve arranged to prevent dripping upon termination of a liquid flow therethrough.

In beverage dispensers for dispensing beverages, such as hot coffee, storage means are provided for retaining a relatively large quantity of the beverage from which are drawn, as desired, the individual portions. Such storage means normally comprise a tank having an outlet, with the outlet normally being provided at the lower end or bottom of the tank. Conduit means are provided for conducting the beverage from the outlet to the point where the individual containers or cups are to be filled. It has been found that, with the valve means now found in the art for selectively closing and opening the outlet, the beverage tends to be retained in the conduit and to drip from the conduit over a period of time.

The principal feature of this invention is the provision of a new and improved valve means for use in a beverage dispenser, arranged to vent the outlet thereof and prevent retention of liquid in the outlet conduit when the valve means is closed.

Another feature is the provision of a new and improved valve for use in a beverage dispenser having a valve stem adapted to connect the valve element to an actuating mechanism and vent the valve outlet to a point above the surface of the liquid in the tank.

A further feature is the provision of such a valve wherein the stem is provided with a bore opening at one end in the outlet and at the other end above the level of the beverage in the dispenser.

A still further feature is the provision of a new and improved valve having a valve member provided with a guide for maintaining alignment with the valve body.

Yet another feature of the invention is the provision of a valve having new and improved means for connection to an actuating mechanism arm comprising a pin extending between the valve member and the arm to prevent longitudinal movement therebetween and a collar surrounding said valve member and said arm to prevent lateral movement therebetween, with said collar being movable to a position to allow ready separation of the valve member and the arm.

Other features and advantages will be apparent from the following description taken in connection with the accompanying drawings, wherein:

Figure 1 is a fragmentary view partly in section and partly broken away of a beverage dispenser with a valve embodying the invention;

Figure 2 is a sectional view taken approximately along the line 2—2 of Figure 1;

Figure 3 is a sectional view taken approximately along the line 3—3 of Figure 1;

Figure 4 is an enlarged fragmentary elevational view of the connecting means; and Figure 5 is a sectional view taken approximately along the line 5—5 of Figure 4.

In the exemplary embodiment of the valve disclosed in the drawings, the beverage dispenser is seen to include a tank 10, supported by a housing 11 above a cup 12. A conduit 13 conducts beverage from tank 10 to cup 12. The valve comprises a movable valve member 14 in tank 10 and a cooperating valve seat carried by and extending through bottom 10a of the tank. Extending upwardly through top 10b of tank 10 from valve member 14 is valve rod 16, which is connected at its upper end to a vertically reciprocable actuating arm 17.

Extending completely through member 14 and rod 16 is a bore 18, acting to vent the valve to atmosphere above tank 10 at all times. A horizontally extending passage 18a comprises the outlet of bore 18 at its upper end and acts to reduce possibility of foreign material entering the bore. Extending through seat 15 is a bore 19 with one end of conduit 13 being in fluid conductive relationship therewith. A guide portion 14a of member 14 extends into bore 19 and is slightly smaller in diameter than the bore. This permits the beverage to pass therearound, while substantially limiting lateral movement of valve member 14 to assure aligned seating engagement when the valve is closed. To connect readily removable rod 16 to arm 17, at least one pin 20 is secured to one of these elements and loosely received in a hole in the other. In the embodiment illustrated two such pins are provided. A collar 21 passes around rod 16 and arm 17 to hold them together laterally.

When member 14 is seated on seat 15 to close the valve, bore 18 remains in communication with bore 19, and thus the valve and conduit 13 are vented. This allows all beverage in conduit 13 to run immediately into cup 12.

When desired, rod 16 may be disconnected from arm 17 by moving collar 21 to allow lateral separation of these elements. To connect these elements, they are moved laterally together until pins 20 are fully inserted, and the collar is then moved to extend around each of the elements.

While we have shown and described certain embodiments of our invention, it is to be understood that it is capable of many modifications. Changes, therefore, in the construction and arrangement may be made without departing from the spirit and scope of the invention as defined in the appended claims.

We claim:

1. A beverage dispenser of the character described, comprising: a tank having a top, and a bottom with an outlet opening therethrough; a valve body carried by said bottom at said outlet opening with a valve seat and a bore therethrough, and having means for connecting a discharge tube thereto; and a valve member having a valve element seatable on said seat, a stem extending from said valve element upwardly through said top, means for readily removably connecting said stem to an actuating mechanism to permit withdrawal of the valve member from the tank when desired, and a guide extending from said valve element through said valve body, with a bore through said valve element, stem, and guide arranged to vent said valve body bore above said tank top.

2. The dispenser of claim 1 wherein the means for connecting said stem comprises an arm on the actuating mechanism, a pin extending into said stem and said arm to prevent longitudinal movement therebetween, and a collar positionable around said stem and said arm to prevent lateral movement therebetween and readily movable to a disposition around only one of said stem and arm to permit lateral movement therebetween when desired.

References Cited in the file of this patent

UNITED STATES PATENTS

| | | |
|---|---|---|
| 8,928 | Schneider | May 1, 1852 |
| 540,844 | Schlueter et al. | June 11, 1895 |
| 765,815 | Christen | July 26, 1904 |
| 844,065 | Wares et al. | Feb. 12, 1907 |
| 880,256 | Vocke | Feb. 25, 1908 |
| 989,113 | Browne | Apr. 11, 1911 |